United States Patent [19]
Makowan

[11] Patent Number: 6,152,173
[45] Date of Patent: Nov. 28, 2000

[54] POSITION INDICATING CHECK VALVE

[75] Inventor: Ted J. Makowan, Schaumburg, Ill.

[73] Assignee: Val-Matic Valve and Manufacturing Corp., Elmhurst, Ill.

[21] Appl. No.: 09/362,059

[22] Filed: Jul. 28, 1999

[51] Int. Cl.⁷ .............................. F16K 15/00; F16K 37/00
[52] U.S. Cl. ........................ 137/556.3; 137/527; 137/553
[58] Field of Search ..................................... 137/553, 556, 137/527, 554, 556.3

[56] References Cited

U.S. PATENT DOCUMENTS

| | | |
|---|---|---|
| 3,254,660 | 6/1966 | Ray ...................................... 137/553 X |
| 4,054,153 | 10/1977 | Guyton . |
| 4,669,500 | 6/1987 | Strelow ............................... 137/553 X |
| 5,139,048 | 8/1992 | Armstrong ............................. 137/553 |
| 5,341,840 | 8/1994 | Manson et al. . |
| 5,746,246 | 5/1998 | Yokota et al. . |

Primary Examiner—Kevin Lee
Attorney, Agent, or Firm—Sonnenschein Nath & Rosenthal

[57] ABSTRACT

A device for visually indicating a position of a check valve disc within the check valve is provided. The indicating device has an exposed element extending outside of the valve body to provide a visual indication of a position of the valve disc, an engaging element, connected to the exposed element, positioned within the valve body to engage the valve disc, a movable seal member to provide an interface between an interior of the valve body and an exterior of the valve body, with the engaging element and the exposed element being connected to the seal member, and a mechanism to hold the engaging element in contact with the valve disc. An electrical switch may be provided for detecting the position of the exposed element and for transmitting an appropriate signal.

24 Claims, 2 Drawing Sheets

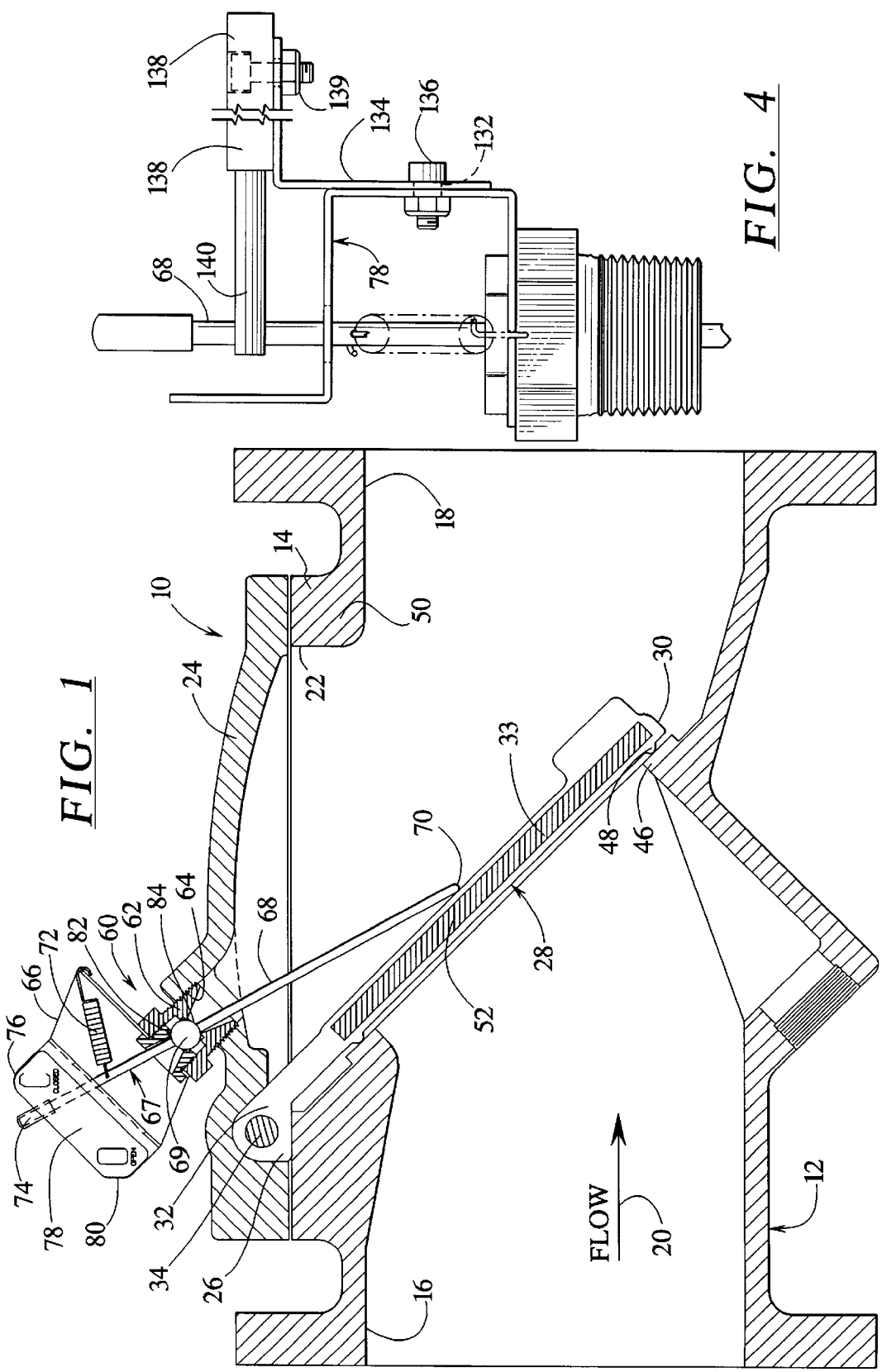

POSITION INDICATING CHECK VALVE

BACKGROUND OF THE INVENTION

Field of the Invention

The present invention relates generally to check valves and, more specifically, to an improvement over check valves with no external moving parts which can be used to indicate a position of an internal valve disc.

Check valves having a closure mechanism consisting of a disc have been commonly used in fluid handling systems to prevent reverse flow in such systems for many years. Typically, these disc check valves have a disc that rotates within the valve body. The disc includes a hinge which is fully contained in the valve body or the valve disc which reduces the possibility of valve body leakage, but prevents indication of disc position. An example of these types of valves is shown in U.S. Pat. No. 4,054,153 and U.S. Pat. No. 5,341,840. The disc typically pivots between about 35°–90° to an open position thereby providing a full flow area or near full flow area. The 35° span of movement is preferred because it provides a short closing stroke which avoids a slamming of the valve in a closed position. The above-described design is reliable because there is only one moving part—the disc. Further, the integral connection between the hinge and the disc avoids any penetrations of the disc for a connection between the hinge and the disc.

While the standard disc check valve design is reliable and economical, many check valve users desire an indication of the position of the disc to verify that there is forward flow in the pipeline containing the check valve. Lack of forward flow may be an indication of pump failure, line blockage, or loss of prime. If the valve remains closed with the pump running and no flow, serious damage to the pump or piping system may occur. Because of this risk, users find it necessary to use more expensive and complex check valves with external levers or spring mechanisms. An example of this type of indicating valve mechanism is disclosed in U.S. Pat. No. 5,746,246.

SUMMARY OF THE INVENTION

The present invention satisfies the aforenoted needs by providing a check valve that includes an indicating device, which can be factory or field mounted to the top of a check valve, to provide an indication of the position of the valve disc. The indicating device can also provide a highly visible indication without interfering with valve operation. The indicating device has an exposed element extending outside of the valve body to provide a visual indication of a position of the valve disc, an engaging element, connected to the exposed element, positioned within the valve body to engage the valve disc, a movable seal member to provide an interface between an interior of the valve body and the exterior, with the engaging element and the exposed element being connected to the seal member and a mechanism to hold the engaging element in contact with the valve disc. The indicating device has provision for mounting of an electrical limit switch for remote indication of valve position.

The indicating device of the present invention preferably comprises a threaded plug which is inserted into a threaded hole or threaded boss on the top of the valve, an indicating bracket, and a rod assembly held in the threaded plug, to extend in both directions (interiorly and exteriorly) from the plug, and which moves in relation to the valve disc. When the valve is closed, an inwardly extending end of the rod is held by a tension spring against the disc. An outwardly extending end of the rod protrudes from the valve housing and terminates near a top end of the indicating plate to show the valve in the "Closed Position". When flow develops in the pipeline, the valve disc lifts up toward a top cover of the valve body. The rod in turn is caused to lift via contact with the disc at its inwardly extending end. The outwardly extending end of the rod then pivots downward toward the "Open" end of the plate. While the rod is in motion, it is held from translating by a spherical element, in the form of a ball, contained in the threaded plug. The ball rotates against non-metallic seals in the body of the indicator plug and maintains the pressure integrity of the valve body. When the rod moves to the closed position, it can engage an optional limit switch trip arm to provide a remote visible and/or audible signal indicating closure of the valve. An alternate or additional limit switch could be provided to indicate an open position of the valve disk.

The position indicator of the present invention can be used in check valves having a freely movable disc or check valves wherein the disc is biased into a closed position by a spring or other mechanism. The position indicator of the present invention can also be installed in the factory as original equipment, or can be installed in the field if the valve body is provided with a threaded boss to receive the threaded plug, or if the valve body is modified in such a way so as to receive the plug carrying the indicating rod described herein.

BRIEF DESCRIPTION OF THE DRAWINGS

The present invention is illustrated more or less diagrammatically in the accompanying drawings, wherein:

FIG. 1 is a sectional view of a valve body, disc check valve and indicating device made in accordance with the present invention;

FIG. 4 is a side elevational view showing the optional limit switch mounted for engagement by the indicating device.

Figure 3:
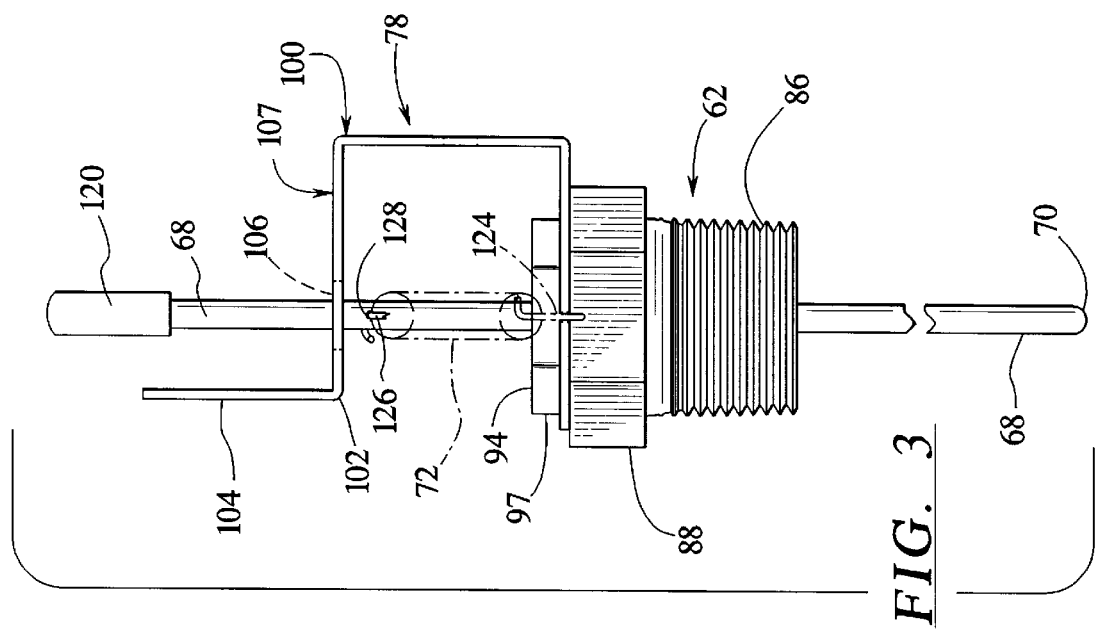
FIG. 3 is a side elevational view of the indicating device of FIG. 2, rotated by 90°.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Like reference numerals will be used to describe like or similar parts from figure to figure in the following description of the drawings.

Turning first to FIG. 1, a disc check valve 10 is illustrated with a valve body 12 that includes a central or main portion 14 having an inlet 16 and an outlet 18. The main portion 14 also defines a flow path indicated by an arrow 20. Further, the main portion 14 of the valve body 12 includes a top opening 22 that is closed by a cover 24. The engagement between the cover 24 and the main portion 14 of the valve body 12 defines a recess 26.

The valve 10 also includes a disc member 28 that includes a distal end 30, a proximal end 32 and a central portion 33. The proximal end 32 is connected to a pin 34. Both the proximal end 32 and pin 34 are accommodated in the recess 26.

The disc 28 normally moves into the closed position, when there is no fluid flow through the valve body 12, by operation of gravity, return flow, or it may be biased into the closed position by a spring as disclosed in pending U.S. application Ser. No. 09/270,725 filed Mar. 17, 1999, incorporated herein by reference.

It will also be noted that the valve body 12 includes a seat 46 for engaging the seating surface of the disc 28 which may also include a sealing bead 48. Further, the valve body 12 may include a similar stop structure 50 for engaging the disc 28 as it moves to the open position.

The disc 28 may be rigid or resilient, and if resilient, may be fabricated from a resilient polymer material. The hinge pin 34 is embedded in the distal end 32 of the disc 28. Further, a stiffening element 52 may also be employed to add structural integrity to the disc 28 as well as weight when the disc is formed of a resilient polymer material.

The present invention provides an indicator assembly 60 which, in the embodiment illustrated, comprises a threaded plug 62 inserted into a threaded hole or threaded boss 64 on the top of the valve cover 24, an indicating bracket 66, and a rod assembly 67 including a rod 68 held in the threaded plug 62 by a pivotable spherical element or ball 69, to extend in both directions from the plug, and which moves in relation to the valve disc 28. When the valve disc 28 is closed, an inwardly extending end 70 of the rod 68 is held by a tension spring 72 against the disc 28. One end of the spring is attached to the rod 68 and an opposite end is held stationary relative to the valve body 12. An outwardly extending end 74 of the rod 68 protrudes from the valve cover and terminates near a top end 76 of an indicating plate 78 to show the valve disc 28 as being in the "closed position". When flow 20 develops in the pipeline, the valve disc 28 lifts up toward the top cover 24 of the valve body 12. The rod 68 in turn is forced to lift via contact with the disc 28 at its inwardly extending end 70. The outwardly extending end 74 of the rod 68 then pivots downward toward an "Open" end 80 of the plate 78. While the rod 68 is in motion, it is held from translating by the ball 69, contained in the threaded plug 62. The ball 69 rotates against non-metallic seals 82, 84 in the indicator plug 62 and maintains the pressure integrity of the valve body 12.

Figure 2:
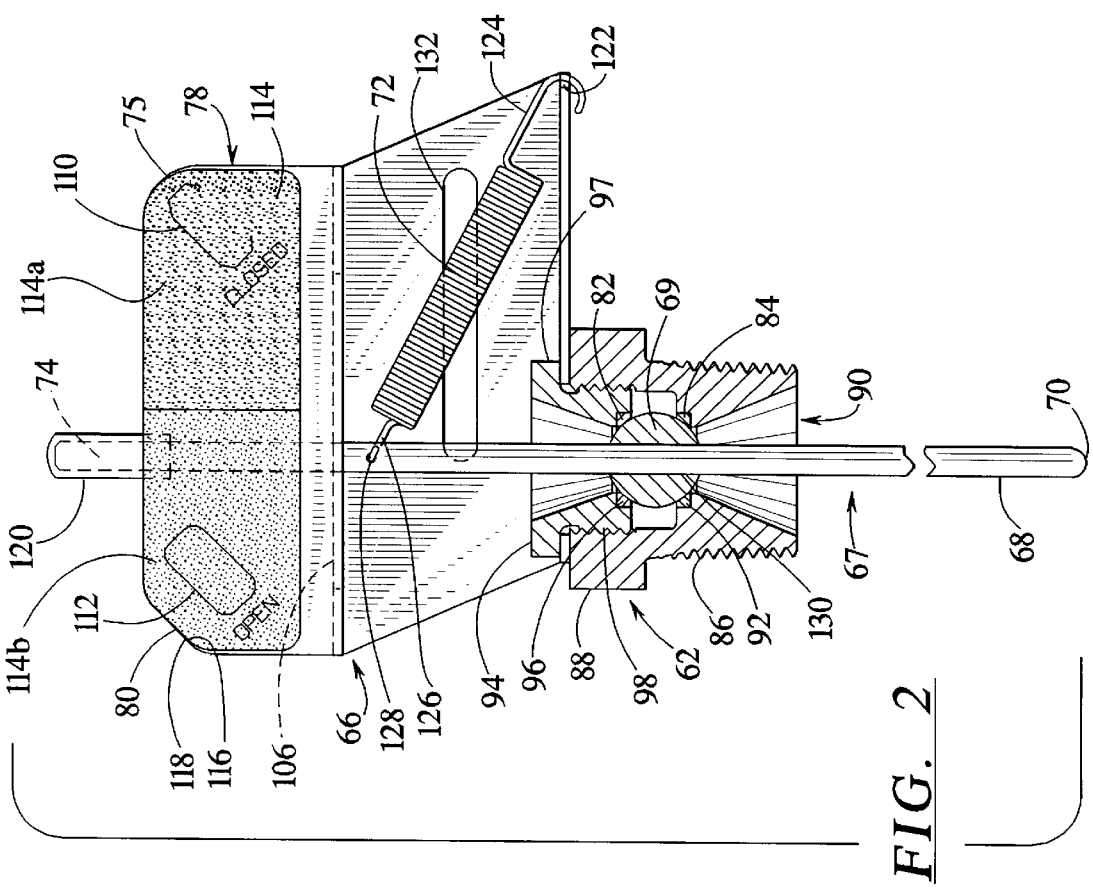
FIG. 2 is an enlarged side sectional view of the indicating device shown in FIG. 1.

The details of the mechanism are shown in FIGS. 2 and 3. The plug 62 is fabricated with a common tapered pipe thread 86 for simple field assembly. A top portion 88 of the plug 62 has a hexagonal shape so that a wrench can be used to install the plug. An interior 90 of the plug 62 has a machined register 92 to accept the non-metallic seal 84 such as Teflon. A plug cover 94 has a similar machined register 96 for the opposing seal 82. The plug cover 94 also has a hexagonal top edge 96 for assembly purposes. Threads 98 in the plug cover 94 are straight, however, so that the cover 94 can be tightened until the indicator plate 78 is pressed tightly and captured against the plug 62. Simultaneously, a slight compression is provided on the nonmetallic seals 82, 84 to provide tight shut off. The operating torque of the indicator mechanism is low because a diameter of the ball 69 is selected to be small (⅝" OD), hence providing a small engagement area between the spherical surface of the ball 69 and spherical surfaces of the seals 82, 84. Low torque is essential so as not to interfere with the operation of the valve disc 28.

The indicator plate 78 is made from thin corrosion resistant steel to facilitate the forming process. The plate 78 contains a vertical offset 100 so that the outside end 74 of the rod 68 can be far enough away from the ball 69 to show movement during valve disc 28 travel. A top bend 102 in the plate 78 is needed to orient a viewing portion 104 of the plate 78 in a vertical plane so that the valve disc position can be seen from several yards from the valve body 12. The plate 78 contains a narrow slot 106 through a horizontal offset 107 to guide the motion of the rod 68. Because the penetration of the rod 68 through the valve is via the ball 69, the rod is free to rotate along any axis. The slot 106 is needed to maintain the relationship between the indicator plate 78 and the motion of the valve disc 28.

Indicia 110, 112, which may be in the form of a self-adhesive label 114 containing large "O" and "C" letters, is affixed to the plate 78 to provide the "open" and "closed" frame of reference. The large "O" and "C" letters are oriented at a 45° angle so that they appear horizontal in the installed position since the installed plug 62 is angled at approximately 45°. The label 114 preferably is formed of one-piece with a special cut out 116 to match a 45° chamfer 118 on the plate 78 so that the label can only be installed in one orientation. The label 114 may be color coded (red= closed (area 114a) and green=open (area 114b)) for long distance viewing. A brightly colored plastic cap 120 may also be added on the outside end 74 of the rod 68 to provide good visibility from either direction.

The operation of the indicator mechanism is dependent on the tension spring 72 which is needed to always hold the rod 68 against the disc 28 of the valve 10. The spring force is needed to overcome flow forces on the rod and frictional forces between the ball 69 and the non-metallic seals 82, 84. The plate 78 contains a slot 122 to accept one end 124 of the spring 72 and to hold it stationary relative to the valve body 12. An other end 126 of the spring 72 passes through a hole 128 in the rod 68.

The rod 68 passes through a machined cylindrical passageway 130 in the ball 69. The rod 68 is affixed to the ball 69 by a compression fit or through the use of an anaerobic retaining compound. The interior end 70 of the rod 68 preferably is machined with a rounded end so that a back surface of the disc 28 is not damaged from repetitive rubbing motion by the end of the rod.

As shown in FIG. 4, an additional slot 132 is provided in the vertical offset 100 for attachments of an L-shaped bracket 134 which is fastened with screws and nuts 136. A limit switch 138 is mounted to the bracket 134 with screws and nuts 139 with its trip arm 140 extending into the swing path of the rod 68. When the rod 68 searches the "closed" position, the trip arm 140 is deflected which actuates the electrical switch 138. The switch position is adjustable by sliding the L-shaped bracket 134 along the slot 132. Other types of switches and mounting arrangement can be utilized to detect the position of the rod 68, including infrared, ultrasonic or other electromagnetic spectrum or Hall effect switches in addition to other arrangements of mechanical switches. The switch could also be positioned to indicate an open position of the value or two switches could be used to provide a different signal for both open and closed positions. The appropriate electrical signal transmitted by operation of the switch can be used for remote visual or audible indication of a valve position, or could also be used for controlling other equipment which may be dependent on flow through the valve.

From the above description, it is apparent that the objects of the present invention have been achieved. While only certain embodiments have been set forth, alternative embodiments and various modifications will be apparent from the above description to those skilled in the art including retaining the plug in the valve body by other than threads on the valve body itself; for example, other fasteners could be used to secure the plug to the valve body, forming the rod as two pieces rather than one piece and shaping the rod or pieces as a flat plate or in shapes other than a round cylinder as shown, using a compression spring or direct attachment to hold the rod against the valve disc, utilizing a movable seal member other than a ball, such as a flexible diaphragm or elastic joint. These and other alternatives are considered equivalents and within the spirit and scope of the present invention. The position indicator of the present invention can be used in check valves having a freely movable disc or check valves wherein the disc is biased into a closed position by a spring or other mechanism. The position indicator of the present invention can also be installed in the factory as original equipment, or can be installed in the field if the valve body is provided with a threaded boss to receive the threaded plug, or is modified in such a way so as to receive the plug carrying the indicating rod described herein.

What is claimed is:

1. A check valve comprising:
    a valve body comprising an inlet and an outlet and defining a flow path therebetween, the valve body further comprising a recess for accommodating a hinge disposed transverse to said flow path,
    said hinge being connected to a disc for pivotal movement of said disc between a closed position isolating said outlet from said inlet and an open position providing communication between said inlet and outlet,
    an indicating device having an exposed element extending outside of said valve body to provide a visual indication of a position of said valve disc, an engaging element, connected to said exposed element, positioned within said valve body to engage the valve disc, a movable seal member to provide an interface between an interior of said valve body and an exterior of said valve body, with said engaging element and said exposed element being connected to said seal member, and a mechanism to hold said engaging element in contact with said valve disc.

2. A check valve according to claim 1, wherein said indicating device comprises a plug threaded to said valve body, said plug carrying said movable seal member.

3. A check valve according to claim 2, wherein said plug has a tapered threaded body.

4. A check valve according to claim 3, wherein said plug has a hexagonal end surface to assist in assembly and tightening of said plug to said valve body.

5. A check valve according to claim 1, wherein said engaging element comprises a rod having a first end engaging said valve disc.

6. A check valve according to claim 5, wherein said first end is rounded where it engages said valve disc.

7. A check valve according to claim 1, wherein said exposed element comprises a rod having an end engaging protruding out of said valve body.

8. A check valve according to claim 1, wherein said movable seal member comprises a pivotable spherical element engaged against non-metallic seal members.

9. A check valve according to claim 1, wherein said engaging element and said exposed element comprise a rod having a first end and a second end, said first end in engagement with said valve disc and said second end extending out of said valve body, said movable seal member comprises a pivoting ball captured in a threaded plug member, said rod extending through and being captured in said ball, and said mechanism comprises a spring attached at one end to said rod and at an opposite end held stationary relative to said valve body.

10. A check valve according to claim 9, further comprising an indicator plate mounted to said valve body to provide a reference to compare a position of said second end of said rod against to determine a position of said valve disc.

11. A check valve according to claim 10, wherein said indicator plate has a slot therein to receive and guide said rod.

12. A check valve according to claim 1, further comprising an indicator plate mounted to said valve body to provide a reference to compare a position of said exposed element against to determine a position of said valve disc.

13. A check valve according to claim 10, wherein said indicator plate includes visible indicia thereon.

14. A check valve according to claim 1, further including an electrical switch mounted for activation by said exposed element when said disc moves to a predetermined position within said valve body.

15. A check valve according to claim 14, wherein said electrical switch comprises a mechanically operated limit switch.

16. A check valve comprising:
    a valve body comprising an inlet and an outlet and defining a flow path therebetween, the valve body further comprising a recess for accommodating a hinge disposed transverse to said flow path and a threaded opening through a wall of said body,
    said hinge being connected to a disc for pivotal movement of said disc between a closed position isolating said outlet from said inlet and an open position providing communication between said inlet and outlet,
    an indicating device comprising a plug threaded on an exterior surface for threaded engagement with said threaded opening in said valve body, a rod having a first end and a second end, said first end in engagement with said valve disc and said second end extending out of said valve body, a movable seal member comprising a pivotable ball captured in said plug to provide an interface between an interior of said valve body and an exterior of said valve body, said rod extending through and being captured in said ball, and a spring attached at one end to said rod and held at an opposite end stationary to said valve housing to hold said engaging element in contact with said valve disc.

17. A check valve according to claim 15, further including an electrical switch mounted for activation by said second end of said rod when said disc moves to a predetermined position within said valve body.

18. A check valve according to claim 17, wherein said predetermined position is a closed position.

19. A check valve according to claim 16, wherein said plug has a tapered threaded body.

20. A check valve according to claim 16, wherein said plug has a hexagonal end surface to assist in assembly and tightening of said plug to said valve body.

21. A check valve according to claim 16, further comprising an indicator plate mounted to said valve body to provide a reference to compare a position of said second end of said rod against to determine a position of said valve disc.

22. A check valve according to claim 21, wherein said indicator plate has a slot therein to receive and guide said rod.

23. A check valve according to claim 21, wherein said indicator plate includes visible indicia thereon.

24. A method of providing a visual indication of a position of a valve disc in a check valve comprising the steps:

providing an opening in a body of the check valve, inserting and securing an indicating device in said opening, said indicating device comprising a plug and a rod having a first end and a second end, positioning said first end of said rod in engagement with said valve disc and extending said second end out of said valve body, capturing a movable seal member comprising a pivotable ball in said plug to provide an interface between an interior of said valve body and an exterior of said valve body, extending said rod through and capturing said rod in said ball, and attaching a spring at one end to said rod and holding an opposite end of said spring stationary to said valve housing to bias said rod into contact with said valve disc.

* * * * *